United States Patent [19]

Bachman

[11] Patent Number: 5,024,810
[45] Date of Patent: Jun. 18, 1991

[54] SUPPORT GRID WITH INTEGRAL INCLINED WAVES

[75] Inventor: William H. Bachman, Simsbury, Conn.

[73] Assignee: Combustion Engineering, Inc., Windsor, Conn.

[21] Appl. No.: 354,709

[22] Filed: May 22, 1989

[51] Int. Cl.[5] .............................................. G21C 3/34
[52] U.S. Cl. .................................... 376/438; 376/442
[58] Field of Search ............................... 376/438, 442

[56] References Cited

U.S. PATENT DOCUMENTS 4,295,935  10/1981  Anthony .............................. 376/442
4,426,355  1/1984   Burger ................................ 376/442

Primary Examiner—Brooks H. Hunt
Assistant Examiner—Meena Chelliah
Attorney, Agent, or Firm—John H. Mulholland

[57] ABSTRACT

A nuclear fuel support grid 10' of egg-crate structure has wave defining strips 12a, 12b, 12c, 12d defined by bends 16' inclined from the vertical and opposing cantilevered springs 18' with inclined spring bases 20' opposing them for support of fuel rods 22 intermediate their ends. The "inclined waves" defined by inclined surfaces formed by bends 16' and spring bases 20' of cantilevered springs 18' provide lateral components to the coolant flow in patterns which enhance DNB and corrosion behavior.

1 Claim, 1 Drawing Sheet

SUPPORT GRID WITH INTEGRAL INCLINED WAVES

This subject matter is related to and assigned to the same assignee as U.S. Ser. No. 048,336 filed May 11, 1987 which is a continuation-in-part of U.S. Ser. No. 876,592, filed June 20, 1986.

FIELD OF THE INVENTION

The present invention relates to nuclear reactors and more particularly to supporting spaced fuel elements in bundles or assemblies in the reactor by means of a welded fuel element support grid with integral flow directing inclined surfaces which direct fluid flow laterally for increased heat transfer and enhanced corrosion behavior.

BACKGROUND OF THE INVENTION

Fuel assemblies for nuclear reactors are generally provided in the form of fuel element or rod arrays maintained by a structure which includes a plurality of welded spacer grids, a lower end fitting and an upper end fitting. Guide tubes provide the structural integrity between the lower end fitting, the upper end fitting and the spacer grids intermediate the ends of the fuel assembly. The spacer grids define an array of fuel rods which, typically, may be rows and columns of up to 20 rods each. One such spacer and support grid is disclosed in U.S. Pat. No. 3,481,832. See also U.S. Pat. No. 4,803,043.

The typical fuel element support grid for supporting a spaced array of nuclear fuel elements or rods intermediate their ends includes a generally quadrangular or other polygonal perimeter. A plurality of fuel element compartments or cells within the perimeter are defined by first and second grid-forming members or strips welded to the perimeter and joined to each other at their lines of intersection. The grid-forming members of the fuel element support grid are slotted for part of their width along lines of intersection with the other grid-forming members of the array such that they may be assembled and interlocked at their lines of intersection in what is termed "egg-crate" fashion. The grid-forming members of one embodiment of the present invention are also bent at points intermediate the walls of the compartments for reasons discussed in U.S. Pat. No. 3,423,287. The wavy-strip structure of this embodiment provides a good strength-to-weight ratio without severely affecting the flow of cooling or moderating fluid through the grid of the nuclear reactor. The grid strip bends typically act as integral arches and act with integral projecting springs for engaging and supporting the fuel elements within the compartments. Thus, at each fuel rod grid position in the fuel assembly, axial, lateral and rotational restraint is provided against fuel rod motion due to coolant flow, seismic disturbance or external impact. The spacer grids also act as lateral guides during insertion and withdrawal of the fuel assembly from the reactor. Since separate arches out of the plane of the grid-forming members are not necessary, a minimum pressure drop is accomplished.

In U.S. Pat. No. 3,764,470, a flow twister, mixing vane, or fluid flow directing vane was disclosed for redirecting the cooling fluid in the channels between the spaced parallel nuclear fuel elements. Those twisters were U-shaped metal sheets which straddled one grid member at an intersection with the free ends of the "U" folded on themselves to form two pairs of oppositely directed spirals and a pair of slots receiving the other grid member. The purpose of the twisters was to direct cooling fluid inwardly toward and spirally around the adjacent fuel rods. The desirability and theory of their use is described in the "Background of the Invention" of U.S. Pat. No. 3,764,470. The same background is applicable to the invention described herein. This patent also shows bent or "wavy" grid-forming members which define integral arches.

As provided in U.S. Ser. No. 048,336, fluid flow directing vanes or "mixing vanes" were integral to the strips and provided improved strength for the grid and improved hydraulic performance of the type previously provided by the separate "twisters" of U.S. Pat. No. 3,764,470. It was noted that a major advantage of the fluid flow directing vanes being integral was the reduced chance of them becoming loose parts or debris within the flow stream circulating in the reactor in a manner which could damage the internals of the reactor.

SUMMARY OF THE INVENTION

The advantages provided by the invention are accomplished in a spacer grid assembly of typical egg-crate assembly. Individual strips of only four different types are required to produce the interior area of the grid using the novel wavy strips with inclined bends and springs but additional types to produce special fuel rod support features or special cells to accommodate guide thimbles or guide tubes can be compatible with the four basic strips.

During fabrication, the strip shape is stamped and bent on suitable dies into a wavy shape with inclined bends. No manual or other post assembly bending is required. Because of the particular shape of the integral inclined spring and strip surfaces they assemble more readily than do bent mixing vanes of a conventional design, as for example seen in U.S. Pat. No. 4,576,786. Moreover, because of the particular design of the grid and "contained" integral fluid flow directing inclined spring and strip surfaces, there is easier access to the welds. Since inclined surfaces are integral and "contained" within the normal width of the strips without projecting beyond the strip edges, they are less likely to be damaged during use and during fuel assembly fabrication than are the projecting integral vanes previously utilized.

The essence of the current design differs from the prior art in that the mixing benefit comes not from an intermix feature but by inclining the axes of the integral support arches and cantilevered springs from the vertical. These integral surfaces or "inclined waves" form channels which provide lateral components to the flow in certain beneficial patterns which enhance DNB performance and corrosion behavior.

During normal operation, the fluid flow directing integral surfaces provide a good mix which affords better heat transfer and a better "thermal margin" for reasons discussed in U.S. Pat. No. 3,764,470. This is accomplished with an acceptable pressure drop because of the absence of abrupt flow control surface bends which integral flow vanes have exhibited in the past.

During fuel assembly reconstitution, individual fuel elements may be removed from and reinserted into the assembly easily. Individual mixing vanes which project beyond the strip edges, as in a conventional design, can become bent during the reinsertion process as the tip of the fuel element first approaches the grid. This bending can lead to blockage of further insertion, or to contact with the reinserted element or adjacent elements during subsequent operation. Such contact can initiate local wear and possibly breaching of the fuel element cladding tube. Also, if the bending of a conventional vane is severe enough, the vane could fracture and become debris within the circulating fluid of the nuclear reactor. Debris is a common source of fuel element breaching in operating reactors. The "contained" inclined surfaces of the instant invention provide a geometry which is nearly impervious to damage by fuel elements during reconstitution, thereby eliminating concerns of contact or debris during subsequent operation.

The spacer grid embodiment of this invention, with inclined bends and integral inclined strip and spring surfaces represents an advantage over designs which use straight strips in that it improves the corrosion behavior and DNB performance of the fuel.

DETAILED DESCRIPTION OF THE DRAWINGS

Figure 1:
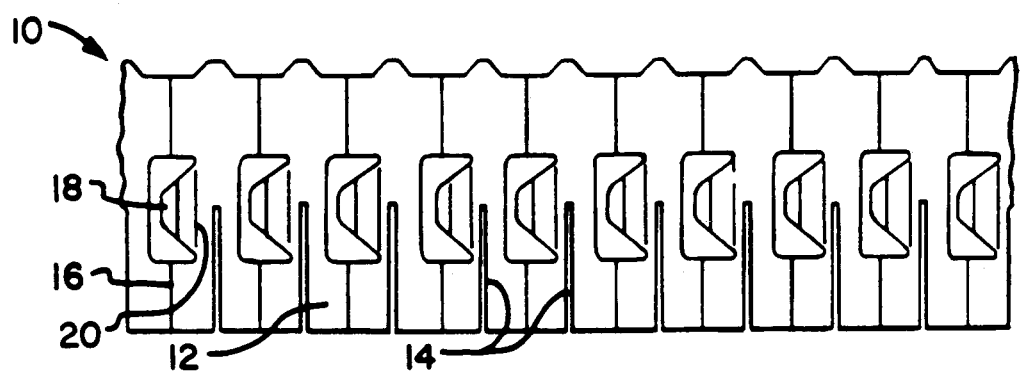
FIG. 1 is a strip configuration schematic elevational view of a top wavy strip of the type previously used in grids of the assignee of the present invention.
Figure 2:
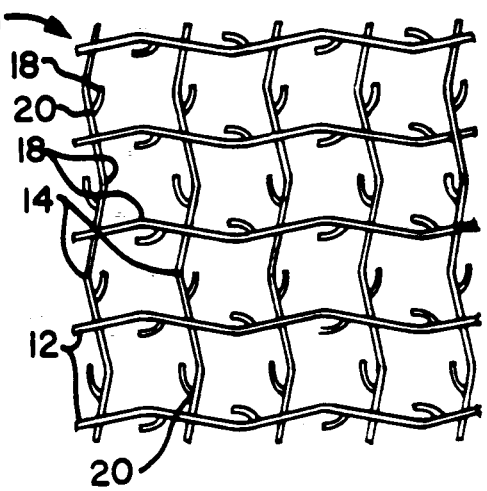
FIG. 2 is a schematic plan view of a portion of the interior of a grid made up of the top strips of FIG. 1 and corresponding bottom strips illustrating the cantilevered springs parallel to the reactor coolant flow and the bends which the wavy strip defines parallel to the reactor coolant flow.
Figure 3A:
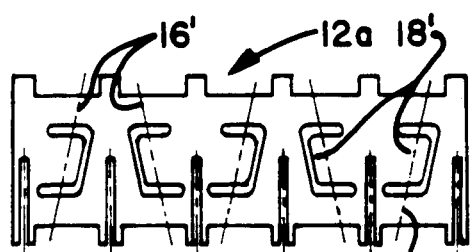
FIGS. 3A to 3D are schematic views similar to FIG. 1 showing the four wavy strips of the current invention.
Figure 3B:
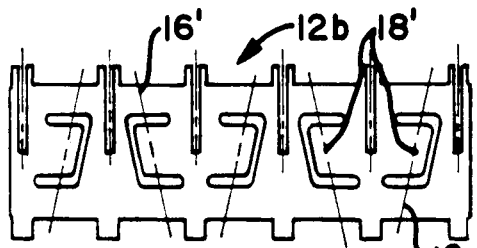
Figure 3C:
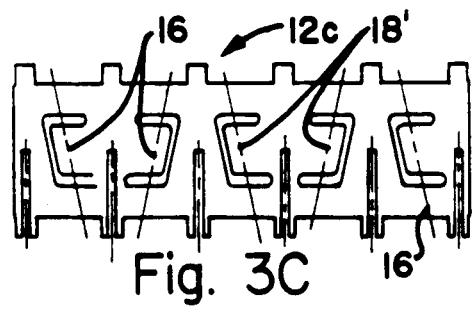
Figure 3D:
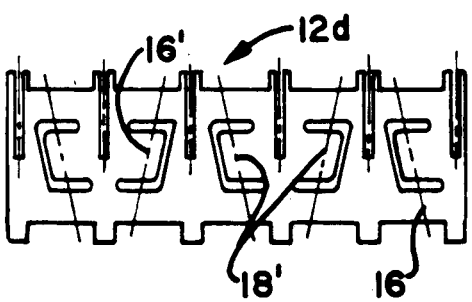

FIGS. 1 and 2 illustrate a prior art fuel element support grid 10 having wavy strips 12, 14, with bends 16 and integral cantilevered springs 18. The bends 16 defining the strip "waves" and the spring bases 20 of the springs 18 are both oriented parallel to the direction of coolant flow through the grid to minimize pressure drop. The bent portion or bends 16 of the strips 12, 14 act as integral arches opposite the springs 18 for holding fuel rods. The disadvantage of this prior art grid structure 10 is that there is no lateral or transverse component of flow created to provide a swirling and mixing motion to enhance heat transfer. Separate integral flow directing vanes (not shown) typically are added thereto when this prior art wavy grid arrangement is utilized. See, for example, U.S. Ser. No. 048,336.

Figure 4:
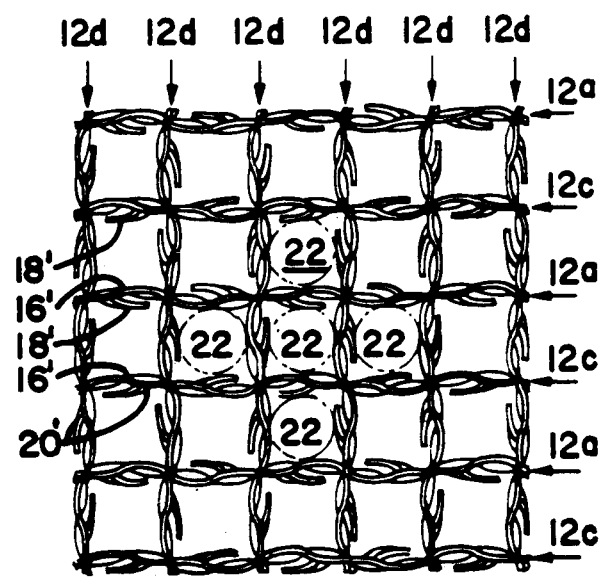
FIG. 4 is a schematic view similar to FIG. 2 showing a portion of the interior of a grid made up of the top strips of FIGS. 3A and 3C and corresponding bottom strips 3B and 3D, illustrating the flow effect of the springs at inclined angles to the reactor coolant flow and the flow effect of the bends which the wavy strip defines at inclined angles to the reactor coolant flow.

FIG. 3A to 3D illustrate strips 12a, 12b, 12c and 12d of the invention which are wavy and correspond to prior art strips 12 and 14 but which include inclined bends 16' formed by inclining the bend line 16' relative to the coolant flow as shown in FIGS. 3A to 30. The bends 16' are shown as "arches" opposing the cantilevered springs 18' in FIG. 4. The cantilevered springs 18' are integrally connected at spring bases 20' to the strips 12a to 12d. Together, the bends 16' formed in strips 12a to 12d and the end tabs of springs 18' act to hold the fuel rods 22 intermediate their ends with minimum pressure drop.

The essence of this invention comes from the inclining of the surfaces of support arches, i.e., the bend 16', and the spring bases 20' of the opposing cantilevered springs 18' from the vertical. These surfaces define "inclined waves" or channels which provide lateral components to the coolant flow in patterns which enhance DNB performance and corrosion behavior.

I claim:

1. In a fuel element support grid for supporting a plurality of nuclear fuel elements intermediate their ends in spaced relation for fluid flow therebetween, said grid including a polygonal perimeter and a plurality of fuel element compartments defined by pairs of first and second intersecting and slottedly interlocked wave defining grid-forming strips attached to said perimeter and to each other, the improvement comprising:

at least some of said strips having its waves defined by bends at spring bases inclined from the vertical and at least some of said strips having spring cantilevered into said compartments from the strips.

* * * * *